US011250096B1

(12) United States Patent
Reynolds et al.

(10) Patent No.: US 11,250,096 B1
(45) Date of Patent: Feb. 15, 2022

(54) NAVIGATION FOR SCREEN READERS USING DATA ANALYTICS

(71) Applicant: International Business Machines Corporation, Armonk, NY (US)

(72) Inventors: Spencer Thomas Reynolds, Austin, TX (US); Raden Tonev, Austin, TX (US); Adam Thomas Lankford, Austin, TX (US); Ty Tyner, Austin, TX (US); Randall Horwitz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/021,663

(22) Filed: Sep. 15, 2020

(51) Int. Cl.
| | | |
|---|---|---|
| *G06F 16/957* | (2019.01) | |
| *H04L 29/08* | (2006.01) | |
| *G09B 21/00* | (2006.01) | |
| *G06F 7/08* | (2006.01) | |
| *G06F 9/451* | (2018.01) | |
| *G06N 20/00* | (2019.01) | |

(52) U.S. Cl.
CPC ............ *G06F 16/9577* (2019.01); *G06F 7/08* (2013.01); *G06F 9/451* (2018.02); *G06N 20/00* (2019.01); *G09B 21/005* (2013.01); *H04L 67/22* (2013.01)

(58) Field of Classification Search
CPC .......... G06Q 30/0282; G06F 16/90324; G06F 16/955; G06F 16/9577; G06F 16/951; G06F 16/9038; G09B 5/02
See application file for complete search history.

(56) References Cited

U.S. PATENT DOCUMENTS

| | | | |
|---|---|---|---|
| 9,633,012 B1* | 4/2017 | Eveland | G06F 16/9038 |
| 2006/0115799 A1 | 6/2006 | Stephen et al. | |
| 2007/0168891 A1 | 7/2007 | Damery et al. | |
| 2012/0310937 A1* | 12/2012 | Stibel | G06F 16/951 |
| | | | 707/737 |
| 2013/0332815 A1 | 12/2013 | Gallo et al. | |
| 2014/0136947 A1* | 5/2014 | Naick | G06F 16/9577 |
| | | | 715/234 |
| 2015/0096041 A1* | 4/2015 | Bommireddipalli | ........................ |
| | | | G06F 16/955 |
| | | | 726/26 |
| 2015/0111190 A1* | 4/2015 | Vittorio | G09B 5/02 |
| | | | 434/319 |
| 2015/0347423 A1* | 12/2015 | Jheeta | G06F 16/90324 |
| | | | 707/767 |
| 2016/0019464 A1 | 1/2016 | Madhavan et al. | |
| 2018/0025395 A1* | 1/2018 | Schiff | G06Q 30/0282 |
| | | | 705/26.7 |

(Continued)

OTHER PUBLICATIONS

IBM, "IBM Accessibility," https://www.ibm.com/able/, printed May 18, 2020, 5 pgs.

(Continued)

*Primary Examiner* — Toan H Vu
(74) *Attorney, Agent, or Firm* — Peter K. Suchecki

(57) ABSTRACT

Provided is a method, computer program product, and system for navigating a webpage with a screen reader using a prioritization model. A processor may collect analytics information for a webpage. The processor may generate, based on the analytics information, a prioritization model for sorting a plurality of elements of the webpage. In response to a user accessing the webpage with a screen reader, the processor may navigate the plurality of elements of the webpage using the prioritization model.

18 Claims, 5 Drawing Sheets

(56) References Cited

U.S. PATENT DOCUMENTS

2019/0317648 A1 10/2019 Pinel et al.
2019/0332654 A1 10/2019 Ivory et al.
2020/0073921 A1 3/2020 Bradley et al.

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Nho, "Vision impairment and blindness," http://www.who.int/newsroom/fact-sheets/detail/blindness-and-visual-impairment, printed May 18, 2020, 2 pgs.

Yin et al., "A Hidden Market: The Purchasing Power of Working-Age Adults With Disabilities," https://www.air.org/system/files/downloads/report/Hidden-Market-Spending-Power-of-People-with-Disabilities-April-2018.pdf, American Institutues for Research, Apr. 2018, 38 pgs.

IBM, "The Accessible Workforce," https://www.ibm.com/ibm/history/ibm100/us/en/icons/accessibleworkforce/, printed Sep. 15, 2020, 4 pgs.

\* cited by examiner

NAVIGATION FOR SCREEN READERS USING DATA ANALYTICS

BACKGROUND

The present disclosure relates generally to the field of screen readers, and more specifically to improving navigation of webpages for screen readers using data driven analytics.

Screen readers are designed to allow a user that may be visually impaired to read text that is displayed on a computer screen by using a speech synthesizer and/or a braille display. Screen readers are configured as an interface between the computer's operating system, its applications, and the user.

SUMMARY

Embodiments of the present disclosure include a method, computer program product, and system for navigating a webpage with a screen reader using a prioritization model. A processor may collect analytics information for a webpage. The processor may generate, based on the analytics information, a prioritization model for sorting a plurality of elements of the webpage. In response to a user accessing the webpage using a screen reader, the processor may navigate the plurality of elements of the webpage using the prioritization model.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
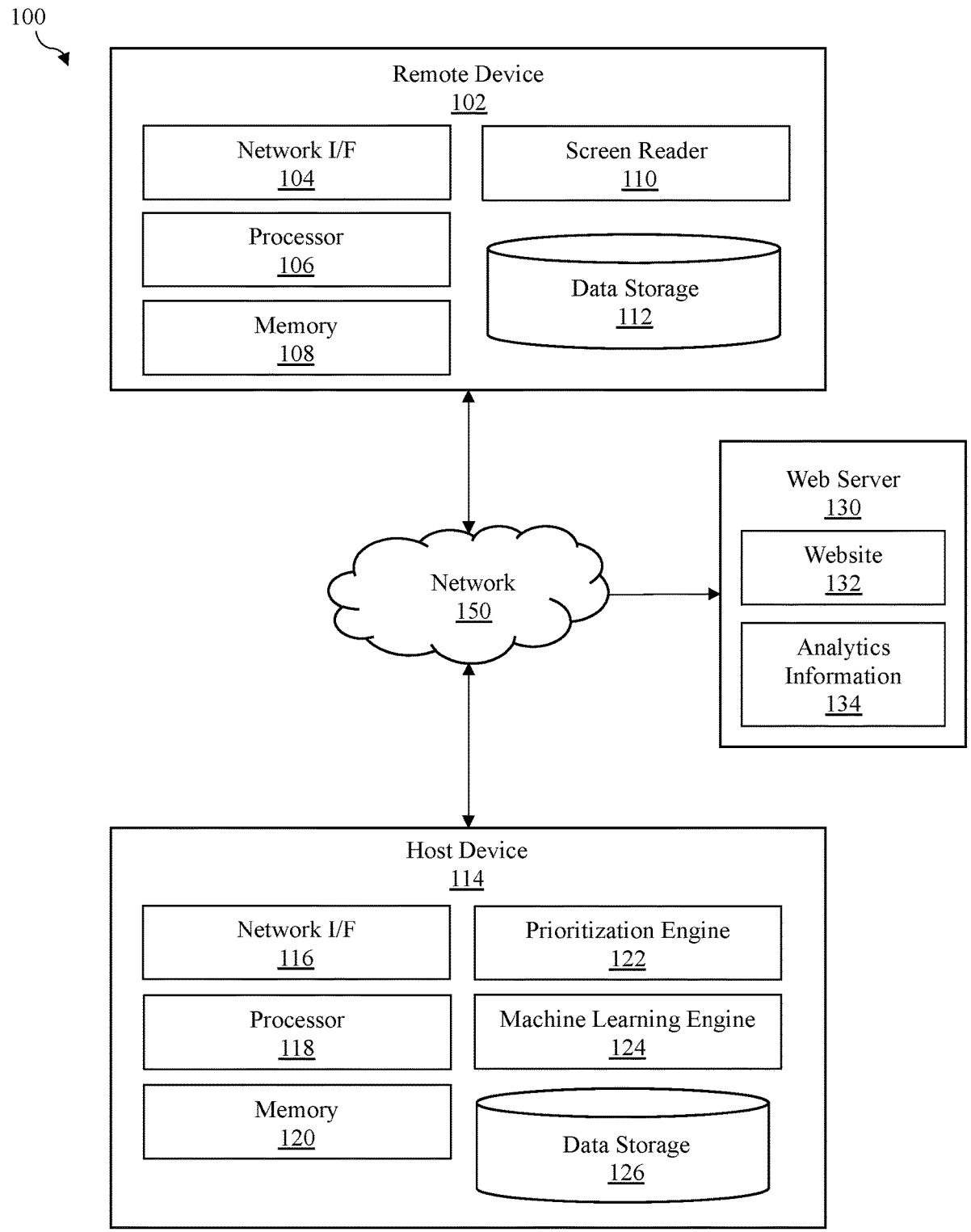
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of screen readers, and more particularly to improving navigation of webpages for screen readers using data driven analytics. While the present disclosure is not necessarily limited to such applications, various aspects of the disclosure may be appreciated through a discussion of various examples using this context.

Screen readers are designed to allow a user that may be visually impaired to read text that is displayed on a computer screen by using a speech synthesizer and/or a braille display. When using a screen reader to browse a webpage or website, the screen reader software translates the hypertext markup language (HTML) structure of a webpage into voice queues and/or braille that enables the user to navigate and interact with the respective elements on the webpage. For example, the screen reader will audibly read various elements such as menus, dropdown lists, and/or icons displayed on the screen as the user navigates through each element of the webpage.

In some instances, webpages may be designed to allow for easy accessibility when using a screen reader by prioritizing which webpage elements are accessed first by the screen reader which allows the user to easily navigate the webpage. For example, web designers may prioritize popular main menu elements and/or action buttons to be read by the screen reader at the onset of a browsing session. These elements may be prioritized by utilizing various webpage tags. However, in many instances, accessibility of the webpage may not be designed for use with a screen reader and may be easily overlooked by web designers and/or developers when creating the webpage.

For example, a webpage with limited accessibility will require the screen reader to navigate and/or read through numerous low-priority elements before a user can access the main navigation or action elements on the webpage. This occurs because the elements on a webpage with limited accessibility are typically read in a sequential/linear order based on how the underling HTML elements and attributes are set up on the respective webpage. This results in inefficient page navigation when using a screen reader which can be inconvenient for the user.

Embodiments of the present disclosure relate to a method, computer program product, and system for navigating a webpage with a screen reader using a prioritization model. The system may collect analytics information for a webpage and/or website. The analytics information may be made available to the system via a web administrator confirmation (opt-in) to share the web traffic data and/or analytics information from the respective webpage. The analytics information may be based on historical usage patterns of various users accessing the webpage over a period of time (e.g., hour, day, month, etc.). For example, the system may collect analytics information such as click rates on different elements within a webpage during a predetermined time period, a heat map of user activity on the webpage, and/or common user navigation paths when accessing certain elements of the webpage. The elements on the webpage may comprise any type of element used to access the contents of the webpage, such as radio buttons, web site links, icons, text boxes, dropdown menus, navigational items, and the like.

In some embodiments, using the collected analytics information, the system may identify an interaction rate for each of the elements on the webpage. The system may identify the interaction rates using a prioritization engine. For example, the system identifies which elements have the most interaction and/or highest traffic by analyzing the analytics information collected from various users visiting the webpage over a time period. In some embodiments, the interaction rate may be based, in part, on a score (e.g., frequency or interaction score) provided by the system for each of the elements using the analytic information. The score may be weighted based on various attributes regarding each of the elements, such as a season or a time the user interaction with the respective elements typically occurs. For example, a dropdown menu having a link to the hours of a business may have high traffic interaction during the early morning versus later in the day. In another example, certain elements on a webpage may have more traffic during a specific season than other elements. For example, user interaction data on a clothing website may increase for a winter clothing menu or item during the winter months versus the summer months.

In embodiments, the system uses the collected analytics information (e.g., interaction rate, score, etc.) for each of the elements to generate a prioritization model for sorting the respective elements of the webpage. For example, the system may use the prioritization model to sort the elements having the highest interaction rate to the lowest interaction rate. In some embodiments, the prioritization model may further sort the elements using a natural order of elements in addition to the interaction rate. For example, the interaction rates for elements 1-50 may indicate that elements 23, 44, 24 have the highest interaction rates in the respective order. If the interaction rates are determined to be the same or similar (e.g., based on a threshold value, range, percentage, etc.), the prioritization model may reorder the elements to be read by the screen reader in a natural sequential order as elements 23, 24, and 44. In this way, the prioritization model may allow the screen reader to read the highest traffic elements first, but may also preserve the natural order of elements on a navigation path as intended by a web designer.

In embodiments, the prioritization model may be provided to screen reader software on a user device when navigating a website. In embodiments, the prioritization model may be implemented in the webpage or website's document object model (DOM) programing interface in order to prioritize which elements are read first by the screen reader during a browsing session. This may occur when a webpage is initially loaded, or it may be manually configured by the user. For example, the user may opt-in to utilize the prioritization model whenever the user is accessing various webpages using the screen reader on the user's device. Using the prioritization model, the system allows the screen reader to navigate a webpage by ensuring the most popular webpage elements are accessed first. In this way, the prioritization model enables the core functions of a webpage/website to be visited and/or navigated more quickly by the user, which increases productivity and navigation efficiency.

In embodiments, the system may utilize machine learning algorithms to continuously process user navigational patterns to improve the prioritization model. In this way, using machine learning can improve predictions on what elements the prioritization model should present first based on changing navigational patterns for users when browsing various webpages.

The aforementioned advantages are example advantages, and not all advantages are discussed. Furthermore, embodiments of the present disclosure can exist that contain all, some, or none of the aforementioned advantages while remaining within the spirit and scope of the present disclosure.

Turning now to the figures, FIG. 1 illustrates a block diagram of an example computing environment 100 in which illustrative embodiments of the present disclosure may be implemented. In some embodiments, the computing environment 100 may include a remote device 102, a host device 114, and web server 130 that are communicatively coupled to each other over network 150.

Consistent with various embodiments, the remote device 102, the host device 114, and the web server 130 may be computer systems. In some embodiments, the remote device 102, the host device 114, the web server 130 may be substantially similar to computer system 1101 detailed in FIG. 3. In some embodiments, the remote device 102 and/or host device 114 may be configured as virtual machines (VMs) and persist as cloud instances on a cloud computing environment. The remote device 102 and the host device 114 may include one or more processors 106 and 118 and one or more memories 108 and 120, respectively. The remote device 102 and the host device 114 may be configured to communicate with each other through an internal or external network interface 104 and 116. The network interfaces 104 and 116 may be, e.g., modems or network interface cards. The remote device 102 and/or the host device 114 may be equipped with a display or monitor. Additionally, the remote device 102 and/or the host device 114 may include optional input devices (e.g., a keyboard, mouse, scanner, or other input device), and/or any commercially available or custom software (e.g., screen reader software, browser software, communications software, server software, natural language processing software, search engine and/or web crawling software, filter modules for filtering content based upon predefined parameters, etc.). In some embodiments, the remote device 102 and/or the host device 114 may be servers, desktops, laptops, or hand-held devices. For example, the remote device 102 may be a personal desktop computer and the host device 114 may be a cloud server configured to generate a prioritization model for use by screen reader 110 of the remote device 102. In embodiments, the remote device 102 and the host device 114 may include one or more data storages 112 and 126 configured to store various types of data (e.g., user interaction data regarding various webpage elements, historical user interaction data, analytics information regarding websites, etc.). In embodiments, the web server 130 is configured to host website 132 and store analytics information 134 which may be accessible by the remote device 102 and/or the host device 114.

The remote device 102, the host device 114, and web server 130 may be distant from each other and communicate over a network 150. In some embodiments, the host device 114 may be a central hub from which remote device 102 and/or web server 130 can establish a communication connection, such as in a client-server networking model. Alternatively, the host device 114, the remote device 102, and the web server 130 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the host device 114 may be local to each other, and communicate via any appropriate local communication medium. For example, the remote device 102 and the host device 114 may communicate using a local area network (LAN), one or more hardwire connections, a wireless link or router, or an intranet. In some embodiments, the remote device 102, the host device 114, and web server 130 may be communicatively coupled using a combination of one or more networks and/or one or more local connections. For example, the remote device 102 may be hardwired to the host device 114 (e.g., connected with an Ethernet cable)

while the web server 130 may communicate with the host device 114 and/or remote device 102 wirelessly using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150. In embodiments, network 150 may be substantially similar to the cloud computing environment 50 illustrated in FIG. 4.

In embodiments, the remote device 102 includes screen reader 110 which is configured to translate the HTML structure of website 132 and/or an associated webpage using a speech synthesizer and/or a braille display. In some embodiments, screen reader 110 may be located on host device 114 and accessible by the remote device 102 through network 150.

In embodiments, the host device 114 includes prioritization engine 122 and machine learning engine 124. In some embodiments, prioritization engine 122 and machine learning engine 124 may be located locally on the remote device 102. In embodiments, prioritization engine 122 is configured to capture, collect, and/or receive analytics information 134 from web server 130. The analytics information 134 may comprise any type of user interaction data generated users when accessing website 132 and/or web server 130. For example, the analytics information 134 may include data indicating how often various website and/or webpage elements (e.g., radio buttons, links, checkboxes, dropdown lists, search fields, tags, icons, message boxes, toggles, navigation elements, text fields, and the like) are accessed or utilized by each respective user visiting website 132. In embodiments, the analytics information 134 may include click rates on elements, a heat map of user activity on a webpage, and/or common user navigation paths using the various elements of website 132. For example, the analytics information 134 may include information that shows that 40% of the time that a user selects element A from the webpage, while element B is the next element selected 30% of time, whereas element C is the next element selected 7% of the time, and so on. The navigation paths may have any depth (e.g., number of steps or elements), and they may be determined using pathfinding algorithms (e.g., a modified Dijkstra's algorithm).

In embodiments, the prioritization engine 122 may use the analytics information 134 to make determinations on which subsequent element(s) to present to a user based on the user's selection of elements when using the prioritization model. For example, the analytics information 134 may indicate that when a plurality of users access a webpage having elements A, B, C, D, E, element B is clicked first by 40% of the users, element C is clicked first by 25% of the users, element A is clicked first by 15% of the users, element D is clicked first by 12% of the users, and element E is clicked first by 8% of the users. Using this information, the prioritization engine 122 may generate a prioritization model that presents the elements to be read by the screen reader 110 when the user lands on the webpage in the order of B, C, A, D and E. However, the user may listen to the elements presented and decide to choose element C, which is the second most popular element chosen by the plurality of users as indicated by the analytics information 134. If the choice of element C does not navigate to another webpage, the prioritization model may again present the elements in the original prioritized order B, C, A, D, and E when the screen reader begins reading the elements again on the webpage. Or, in some embodiments, the prioritization engine 122 can utilize the analytics information 134 to determine a new prioritization model that presents the elements in a new order based on what previous users that have selected element C first in the past have selected subsequently thereafter. The new prioritization model may utilize a navigation path or a series that prioritizes what a second action would be after users first pick element C when accessing the webpage. For example, the analytics information 134 may show that 70% of users that pick element C first, pick element D next, and then element E. The prioritization engine 122 may create a new prioritization model using this data. Using the new prioritization model for the user that selected element C first, the screen reader may present the user with element D followed by element E. In this way, the prioritization model may be tailored to specific choices made by the user based on historical actions of other similar users.

In embodiments, the analytics information 134 may be collected only upon approval from a website administrator and/or users of the website that have the screen reader (or similar) app installed. For example, during an initialization process, the prioritization engine 122 may inform the website administrator of the types of data that it will collect (e.g., user clicks, heat map data, various data analytics, etc.) and the reasons why the data is being collected. In these embodiments, the prioritization engine 122 will only start collecting the analytics information upon the website administrator explicitly permitting the collection. Furthermore, the system may only collect the data that is necessary to generate a prioritization model to be used by the screen reader 110. The collected data may be anonymized and/or encrypted while in use, and the data may only be maintained as needed for generating the prioritization model. If the website administrator decides to opt out of allowing use of the analytics information 134, any analytics information previously collected may be permanently deleted.

Using the analytics information 134, the prioritization engine 122 may generate a prioritization model for use by the screen reader 110 when navigating website 132. In some embodiments, the prioritization model sorts a plurality of elements of website 132 (or a webpage(s)) via associated interaction rates. The prioritization model may rank/sort the elements from the highest interaction rate to the lowest interaction rate. The prioritization engine may implement the prioritization model when the screen reader 110 is navigating website 132 by including the model in the DOM interface of the website/webpage. Using the prioritization model, the screen reader 110 is enabled to navigate website 132 and/or associated webpages starting with the elements that have the most user traffic and/or highest interaction rate to the least user traffic and/or lowest interaction rate. In this way, the prioritization model enables the user to visit the most popular page elements without having to unnecessarily navigate lower priority elements.

In embodiments, machine learning engine 124 may continuously process various changes in user navigational patterns that are gathered from the analytics information 134 to improve the prioritization model. For example, in order to prevent classifying certain elements as being a high priority elements (e.g., because of having high interaction rates) the machine learning engine 124 may use the gathered data to determine which elements may have been misclassified in error and correct the classification. For example, certain elements such as log out buttons may have high interaction rates but may not be considered a high priority when a user begins a browsing session on a webpage. The machine learning engine 124 may utilize various metadata (e.g., timestamp info for when a user clicks various elements) to make determinations which elements may be improperly classified as high priority within the prioritization model and correct those classification. The machine learning engine 124 may modify the prioritization model algorithms to provide a more accurate prediction on what elements a user using a screen reader would initially prefer to access on the webpage. In this way, certain elements will not be initially presented to the screen reader even if the respective element has a high interaction rate.

In embodiments, machine learning engine 124 may utilize a feedback model to improve the prioritization model. The feedback model may be used to monitor a user's screen reader usage and/or actions to determine if the prioritization model is presenting the correct elements to the user at an appropriate time (e.g., the beginning, middle, or end of a browsing session, etc.). The feedback model may identify, based on the user's interaction with the screen reader, whether the correct element was predicted by detecting if the user continues on the associated navigation path provided by the prioritization model or if the user changes course by having the screen reader move through different elements from a different path (e.g., the user wants to go to a different menu element than what was presented by the prioritization model). In this way, the feedback model will be used by the machine learning engine 124 to strengthen individualized prioritization of elements specific to each user. Further, the machine learning engine 124 may utilize other feedback methods such as monitoring user preferences to improve the prioritization model.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

While FIG. 1 illustrates a computing environment 100 with a single remote device 102, a single host device 114 and a single web server 130, suitable computing environments for implementing embodiments of this disclosure may include any number of remote devices, host devices, and web servers. The various modules, systems, and components illustrated in FIG. 1 may exist, if at all, across a plurality of remote devices, host devices, and web servers.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
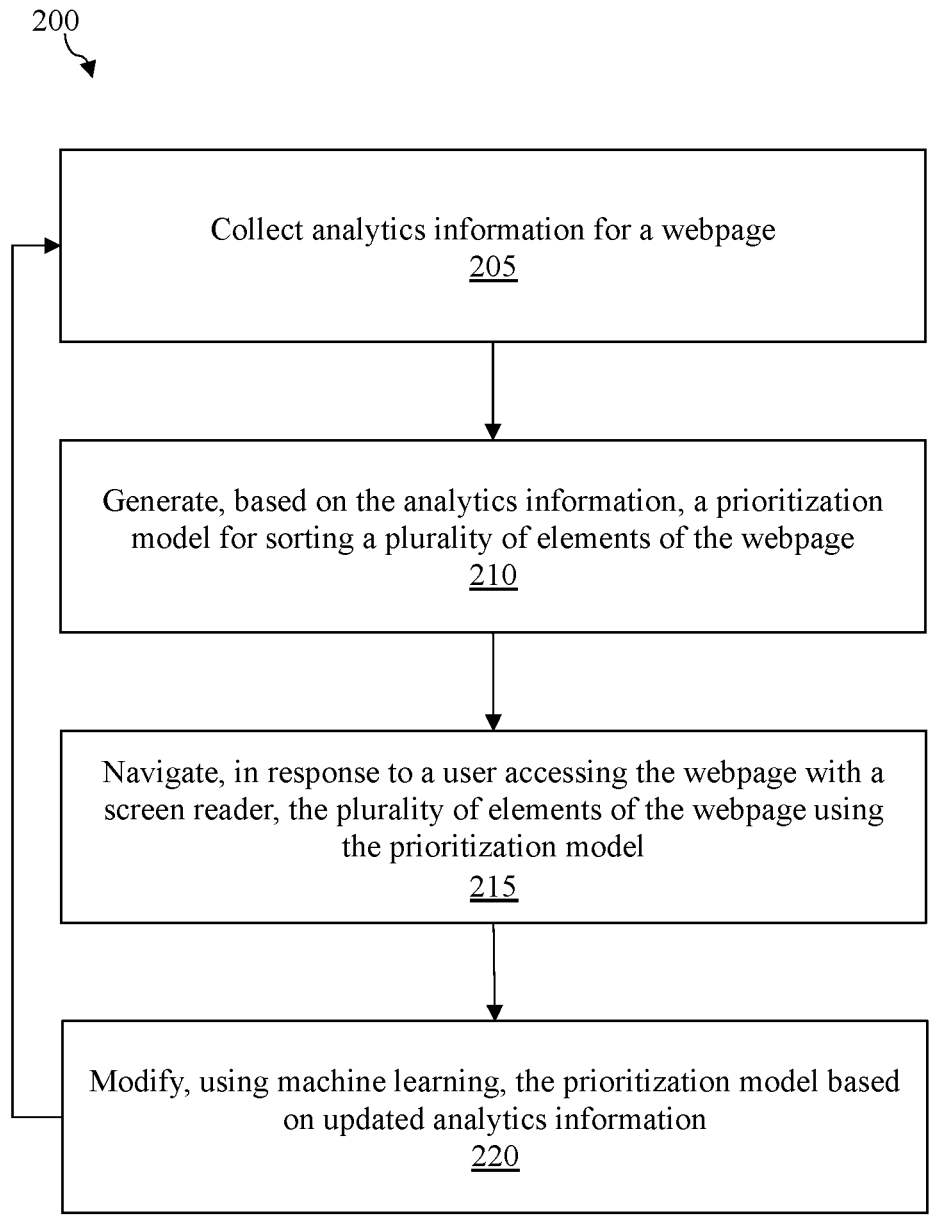
FIG. 2 illustrates a flow diagram of an example process for navigating a webpage with a screen reader using a prioritization model, in accordance with embodiments of the present disclosure.

Referring now to FIG. 2, shown is a flow diagram of an example process 200 for navigating a webpage with a screen reader using a prioritization model, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 106 and/or processor 118 exemplified in FIG. 1.

The process 200 begins by collecting analytics information for a webpage. This is illustrated at step 205. The analytics may be collected by a prioritization engine (e.g., prioritization engine 122) located on a host device (e.g., host device 114) that is configured to access a website (e.g., website 132) and/or webpage. The analytics information can be any type of data that indicates webpage/web site traffic related to various web elements on the webpage. For example, the analytics information may include a click rate for each element on the webpage (e.g., number of clicks on a link or menu item of a webpage by various users). In another example, the analytics information may be based on an available heat map for the web elements on the webpage. The heat map may be based on past user activity that is linked to user interaction data with underlying HTML elements at those locations on the webpage. In another example, the analytics information may be based on a common user navigation path for accessing the plurality of elements. For example, using user interaction data, the analytics information may predict a typical navigation path each user takes when accessing the webpage based on past/historic user interaction data for a plurality of users.

In embodiments, the web elements may be configured as any type of object/item that a user interacts with when navigating a webpage or website such as radio buttons, links, checkboxes, dropdown lists, search fields, tags, icons, message boxes, toggles, navigation elements, text fields, and the like.

In some embodiments, the prioritization engine will identify which elements users typically interact with the most based on the analytics information. For example, the prioritization may determine an interaction rate for a plurality of elements based on the analytics information. In some embodiments, the interaction rate may be based in part on a score (e.g., frequency score). For example, the more a user clicks on an element, a higher score may be determined for the respective element. In some embodiments, the score may be weighted based on various attributes regarding each of the elements, such as a time that user interaction with the respective elements typically occurs. For example, a drop-down menu having a link to the hours of a business may have high traffic interaction during the early morning versus later in the day. In another example, the score may be weighted based on user-specific information. For example, if the user includes various profile information with the system, the score may be weighted to predict which element(s) a specific user type would want to read first when utilizing a screen reader. For example, if the user includes profile information, such as what the user does (e.g., student, occupation, etc.), the system may weight the score for the element accordingly such that it is provided a higher interaction score. For example, a student accessing a university website may prefer to read elements related to the student's curriculum first, whereas a parent might be more likely to click on elements related to financial aid first.

The process 200 continues by generating, based on the analytics information, a prioritization model for sorting the plurality of elements of the webpage. This is illustrated at step 210. In embodiments, the prioritization engine generates a prioritization model that sorts the plurality of elements from a highest interaction rate to a lowest interaction rate (e.g., highest score to lowest score). In some embodiments, the prioritization model sorts the plurality of elements using a natural sequential order of elements in addition to the interaction rate. For example, the prioritization engine may determine that for elements 1 through 10, elements 6, 4, and 8 have the highest interaction rates in that respective order. However, if the interaction rates for these elements are determined to be within a predetermined threshold (e.g., percentage amount, range, etc.), the prioritization engine may organize these elements according to their natural sequential order (e.g., prioritize these elements in sequential order 4, 6, and 8), and present them to the user initially in this order. In this way, the prioritization engine takes advantage of high traffic ordering while also aiming to preserve the natural sequential order of elements on a navigation path that a web designer may have intended.

In some embodiments, the prioritization engine may base the prioritization model on another (e.g., a second) prioritization model for a similar website and/or webpage in the event the prioritization engine has not been granted access to a website's analytics information. For example, the prioritization engine may utilize natural language processing to analyze the text content of a website to determine what type of webpage is being displayed. Once analyzed, the prioritization engine may use prioritization models from similar pages to determine a comparable prioritization model for the respective page based on the similarities in the web content. For example, websites for businesses, hospitals, schools, and/or universities may utilize similar navigation elements (e.g., menus, toggles, links, etc.), and therefore similar prioritization models may be applied accordingly.

The process 200 continues by navigating, in response to a user accessing the webpage with a screen reader, the plurality of elements of the webpage using the prioritization model. This is illustrated at step 215. Once the prioritization model is generated, it may be implemented by the prioritization engine in the respective webpage/websites DOM programming interface in order to prioritize which elements are read first by the screen reader during a browsing session. For example, when a user begins navigating a webpage using the screen reader, the implemented prioritization model is configured to start the screen reader at a first element having a highest interaction rate and proceed to a second element having a lower interaction rate. This process continues until all elements on the webpage are read or until the user ends the browsing session. In this way, as the screen reader is used to navigate according to the prioritization model, the new prioritization order is followed that ensures that the most popular page elements are read first. This allows the user to navigate the core functions of the webpage/website which dramatically increases user productivity.

In some embodiments, the process 200 continues by modifying, using machine learning, the prioritization model based on updated analytics information. This is illustrated at step 220. In embodiments, the prioritization engine may utilize machine learning (e.g., machine learning engine 124) to continuously process user navigational patterns to improve the prioritization model algorithm. In this way, the system may use the analytics information in a more effective way and correct various miscalculations. For example, a logout button might be categorized as a high traffic element, but may not be considered a high priority element when a user just began to access the webpage. The machine learning engine may detect such instances (e.g., utilizing various time lengths when users typically access certain elements) and correct the prioritization model accordingly. In some embodiments, the prioritization engine may modify, using feedback learning model, the prioritization model based on user interaction data. In embodiments, the process 200 may return to step 205 to collect analytics information from the website/webpage in order to continuously improve the prioritization model.

Figure 3:
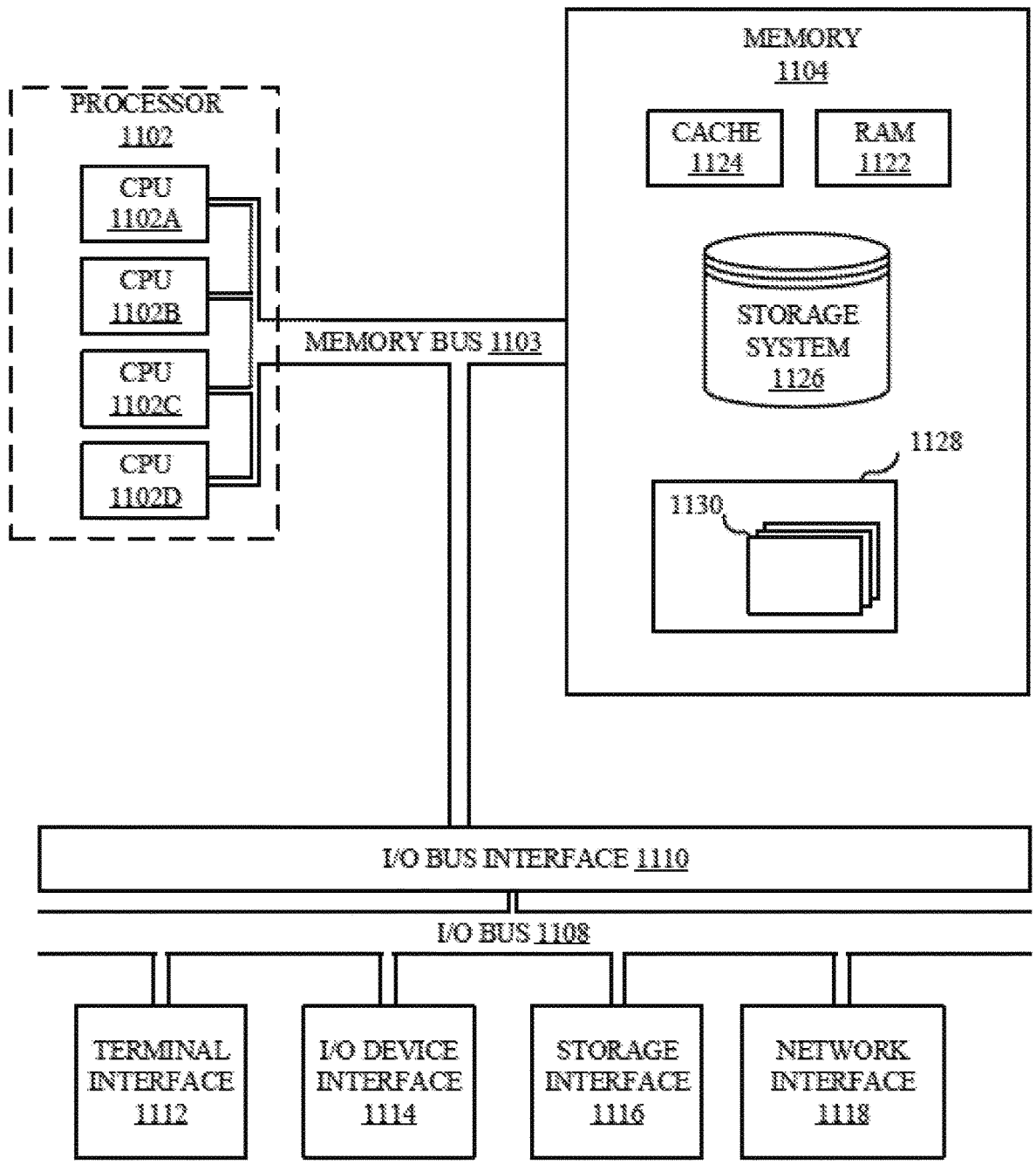
FIG. 3 illustrates a high-level block diagram of an example computer system that may be used in implementing one or more of the methods, tools, and modules, and any related functions, described herein, in accordance with embodiments of the present disclosure.

Referring now to FIG. 3, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 3 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 1101. In some embodiments, however, individual components may have greater or lesser complexity than as represented in FIG. 3, components other than or in addition to those shown in FIG. 3 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
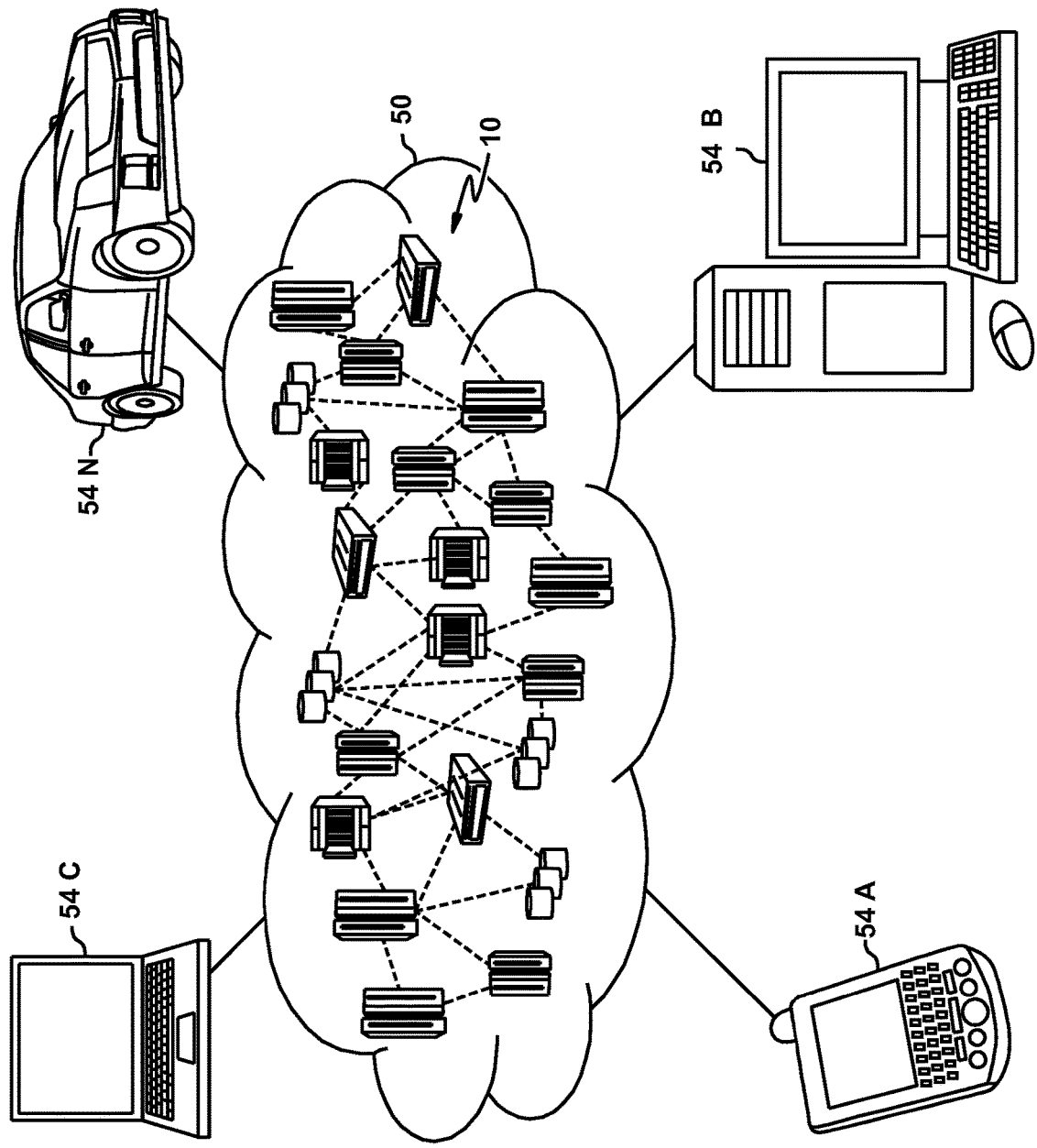
FIG. 4 depicts a cloud computing environment in accordance with embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
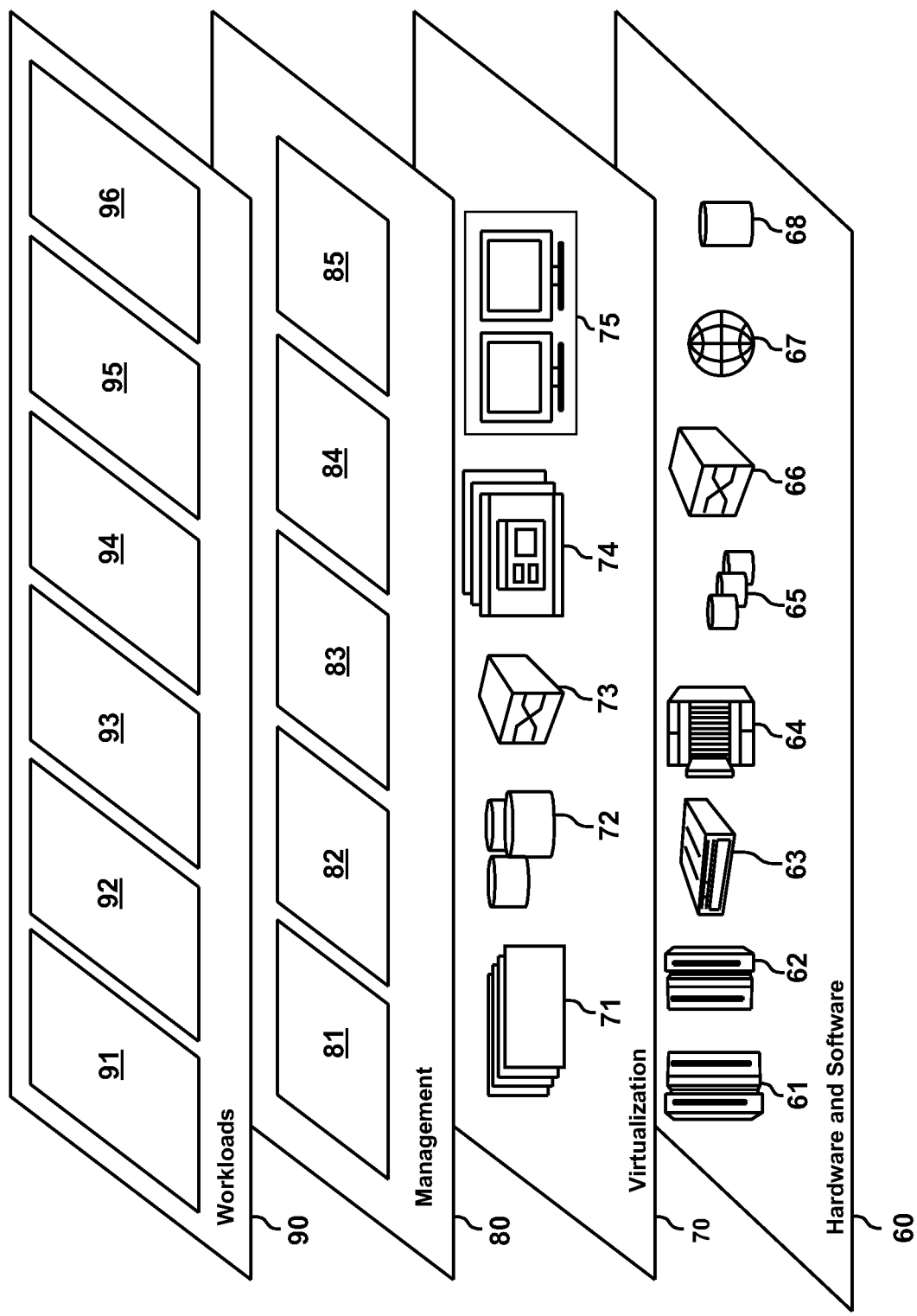
FIG. 5 depicts abstraction model layers in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and prioritization engine software 68 in relation to the prioritization engine 124 of host device 114 illustrated in FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   collecting analytics information for a webpage, wherein the analytics information comprises a common user navigation path for accessing a plurality of elements of the webpage;
   generating, based on the analytics information, a prioritization model for sorting the plurality of elements of the webpage; and
   navigating, in response to a user accessing the webpage with a screen reader, the plurality of elements of the webpage using the prioritization model.

2. The computer-implemented method of claim 1, further comprising:
   modifying, using machine learning, the prioritization model based on updated analytics information, wherein the analytics information is related to user interactions with the plurality of elements on the webpage.

3. The computer-implemented method of claim 1, further comprising:
   modifying, using a feedback learning model, the prioritization model based on user interaction data.

4. The computer-implemented method of claim 1, wherein the prioritization model sorts the plurality of elements based on an interaction rate, wherein the plurality of elements are sorted from a highest interaction rate to a lowest interaction rate.

5. The computer-implemented method of claim 4, wherein the prioritization model sorts the plurality of elements using a natural order of elements in addition to the interaction rate.

6. The computer-implemented method of claim 1, wherein the analytics information comprises a click rate for each of the plurality of elements.

7. The computer-implemented method of claim 1, wherein the analytics information comprises a heat map for the plurality of elements.

8. The computer-implemented method of claim 1, wherein the plurality of elements comprises at least one element selected from the group consisting of: radio buttons, links, checkboxes, dropdown lists, search fields, tags, icons, message boxes, toggles, navigation elements, and text fields.

9. The computer-implemented method of claim 1, wherein navigating the webpage using the prioritization model begins at a first element having a highest interaction rate and proceeds to a second element having a lower interaction rate.

10. The computer-implemented method of claim 1, wherein the prioritization model is based on a second prioritization model for a similar webpage.

11. A system comprising:
    a processor; and
    a computer-readable storage medium communicatively coupled to the processor and storing program instructions which, when executed by the processor, cause the processor to perform a method comprising:
       collecting analytics information for a webpage, wherein the analytics information comprises a heat map for a plurality of elements of the webpage;
       generating, based on the analytics information, a prioritization model for sorting the plurality of elements of the webpage; and
       navigating, in response to a user accessing the webpage with a screen reader, the plurality of elements of the webpage using the prioritization model.

12. The system of claim 11, further comprising:
    modifying, using machine learning, the prioritization model based on updated analytics information, wherein the analytics information is related to user interactions with the plurality of elements on the webpage.

13. The system of claim 11, wherein the prioritization model sorts the plurality of elements based on an interaction rate, wherein the plurality of elements are sorted from a highest interaction rate to a lowest interaction rate.

14. The system of claim 13, wherein the prioritization model sorts the plurality of elements using a natural order of elements in addition to the interaction rate.

15. A computer program product comprising a computer-readable storage medium having program instructions embodied therewith, the program instructions executable by a processor to cause the processor to perform a method comprising:

collecting analytics information for a webpage;

generating, based on the analytics information, a prioritization model for sorting a plurality of elements of the webpage; and navigating, in response to a user accessing the webpage with a screen reader, the plurality of elements of the webpage using the prioritization model, wherein navigating the webpage using the prioritization model begins at a first element having a highest interaction rate and proceeds to a second element having a lower interaction rate.

16. The computer program product of claim 15, wherein the method performed by the processor further comprises:

modifying, using machine learning, the prioritization model based on updated analytics information, wherein the analytics information is related to user interactions with the plurality of elements on the webpage.

17. The computer program product of claim 15, wherein the prioritization model sorts the plurality of elements based on an interaction rate, wherein the plurality of elements are sorted from the highest interaction rate to the lowest interaction rate.

18. The computer program product of claim 17, wherein the prioritization model sorts the plurality of elements using a natural order of elements in addition to the interaction rate.

* * * * *